US008302929B2

(12) United States Patent
Lanio

(10) Patent No.: US 8,302,929 B2
(45) Date of Patent: Nov. 6, 2012

(54) SHEET MATERIAL HANGER

(76) Inventor: Kimberley Lanio, Dallas, TX (US)

( * ) Notice: Subject to any disclaimer, the term of this patent is extended or adjusted under 35 U.S.C. 154(b) by 252 days.

(21) Appl. No.: 12/572,006

(22) Filed: Oct. 1, 2009

(65) Prior Publication Data

US 2011/0079689 A1 Apr. 7, 2011

(51) Int. Cl.
*F16M 11/00* (2006.01)
*A47G 29/00* (2006.01)

(52) U.S. Cl. .................. 248/683; 248/206.5; 248/441.1; 248/452; 248/458

(58) Field of Classification Search .................. 248/683, 248/206.5, 452, 458; 211/45, 47 R
See application file for complete search history.

(56) References Cited

U.S. PATENT DOCUMENTS 60,833 A * 1/1867 Clark .............................. 84/521
290,381 A * 12/1883 Wood ............................ 248/452
3,529,328 A * 9/1970 Davison .......................... 24/303
5,052,085 A * 10/1991 Gau ................................ 24/501
5,120,014 A * 6/1992 Chou ............................ 248/451
5,908,207 A * 6/1999 Wilson ............................ 281/45
6,468,614 B1 10/2002 LeVine et al.
6,971,621 B2 * 12/2005 Gaines .......................... 248/447
7,464,494 B2 12/2008 Bodinet
7,469,869 B2 * 12/2008 Killion ....................... 248/309.4
2005/0283953 A1 * 12/2005 Jeffrey ............................ 24/303

OTHER PUBLICATIONS

MagneCorp, Inc. MagnaClamp. Retrieved Jun. 29, 2009 from http://www.magnecorp.com/holders.html.

MagneCorp, Inc. Ceiling Banner Holders. Retrieved Jun. 29, 2009 from http://www.magnecorp.com/holders.html.

* cited by examiner

*Primary Examiner* — Amy J. Sterling

(57) ABSTRACT

A hanger for sheet material and method of hanging sheet material. An embodiment of the hanger for sheet material includes a base, a magnet assembly support member adjacent the base, and a magnet assembly. The magnet assembly may include one or more holding members and one or more magnets. Each magnet may be attached to a holding member. Each holding member may be hinged to the magnet assembly support member.

10 Claims, 6 Drawing Sheets

SHEET MATERIAL HANGER

FIELD OF THE INVENTION

This invention is related to hanger devices, and more particularly to hangers for sheet material.

BACKGROUND OF THE INVENTION

Various devices are used to hang or otherwise support artwork, such as paintings or photographs. Many of those devices are not adjustable, substantially interfere visually with the artwork they support, or damage the artwork.

Thus, there may be a need for a sheet material hanger that overcomes those drawbacks.

BRIEF DESCRIPTION OF THE DRAWINGS

The accompanying drawings, wherein like reference numerals are employed to designate like components, are included to provide a further understanding of a sheet material hanger, are incorporated in and constitute a part of this specification, and illustrate embodiments of the sheet material hanger that together with the description serve to explain the principles of the sheet material hanger.

Various other objects, features and advantages of the invention will be readily apparent according to the following description exemplified by the drawings, which are shown by way of example only, wherein.

SUMMARY OF THE INVENTION

Figure 1:
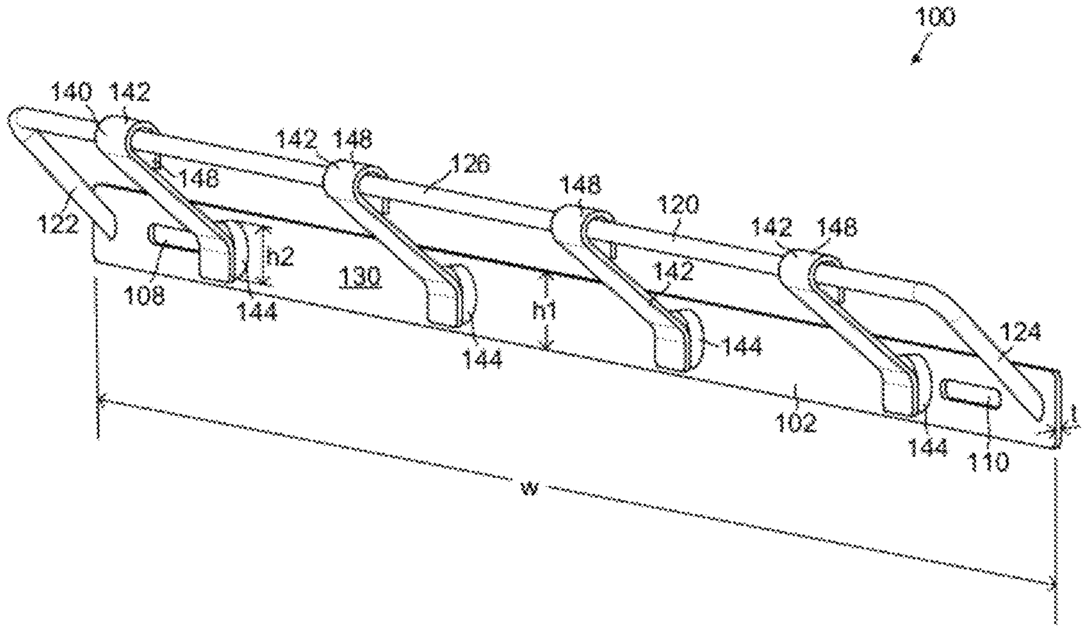
FIG. 1 illustrates a perspective view of an embodiment of a sheet material hanger.

The present invention is directed to systems, methods, and apparatuses for hanging sheet materials. In accordance with one embodiment of the present invention, a sheet material hanger having a base, a magnet assembly support member adjacent the base, and a magnet assembly is provided. The magnetic assembly includes one or more holding members and one or more magnets, wherein each of the one or more magnets is attached to one of the one or more holding members, and each of the one or more holding members is hinged to the magnet assembly support member.

In accordance with another embodiment of the present invention, a method of hanging sheet material is provided. That method includes placing the sheet material on a base, moving a magnetic holding member along a magnet assembly support member adjacent the base, and magnetically attaching the sheet material between the base and the magnetic holding member.

In accordance with yet another embodiment of the present invention, a sheet material hanger is provided that includes a base, means for supporting a magnet assembly adjacent the base, and means for allowing rotation of the magnet assembly about the means for supporting the magnet assembly.

Accordingly, the present invention provides solutions to the shortcomings of prior sheet material hanging systems, methods, and apparatuses. Those of ordinary skill in the art will readily appreciate, therefore, that those and other details, features, and advantages of the present invention will become further apparent in the following detailed description of embodiments of the invention.

DETAILED DESCRIPTION

Reference will now be made to embodiments of a sheet material hanger, examples of which are illustrated in the accompanying drawings. Details, features, and advantages of the sheet material hanger will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

As used herein, "sheet material" refers to relatively thin materials that may be held, as described herein, by an embodiment of the hanger including, for example, paper, parchment, canvas, and leather. The sheet material may be a piece of art, such as a painting, drawing, poster, or photograph, for example. It should be recognized, though, that any material that may be held by the hanger as described herein would fall within the meaning of the term "sheet material." The thickness or thicknesses of the part of the sheet material attached to the hanger may be different than the thickness or thicknesses of other portions of the sheet material.

Figure 2:
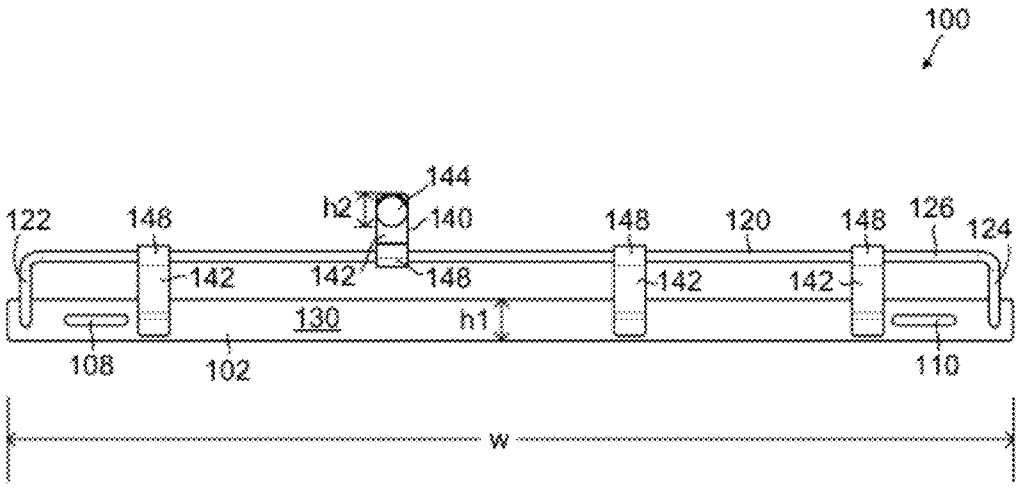
FIG. 2 illustrates a front view of the sheet material hanger of FIG. 1.
Figure 3:
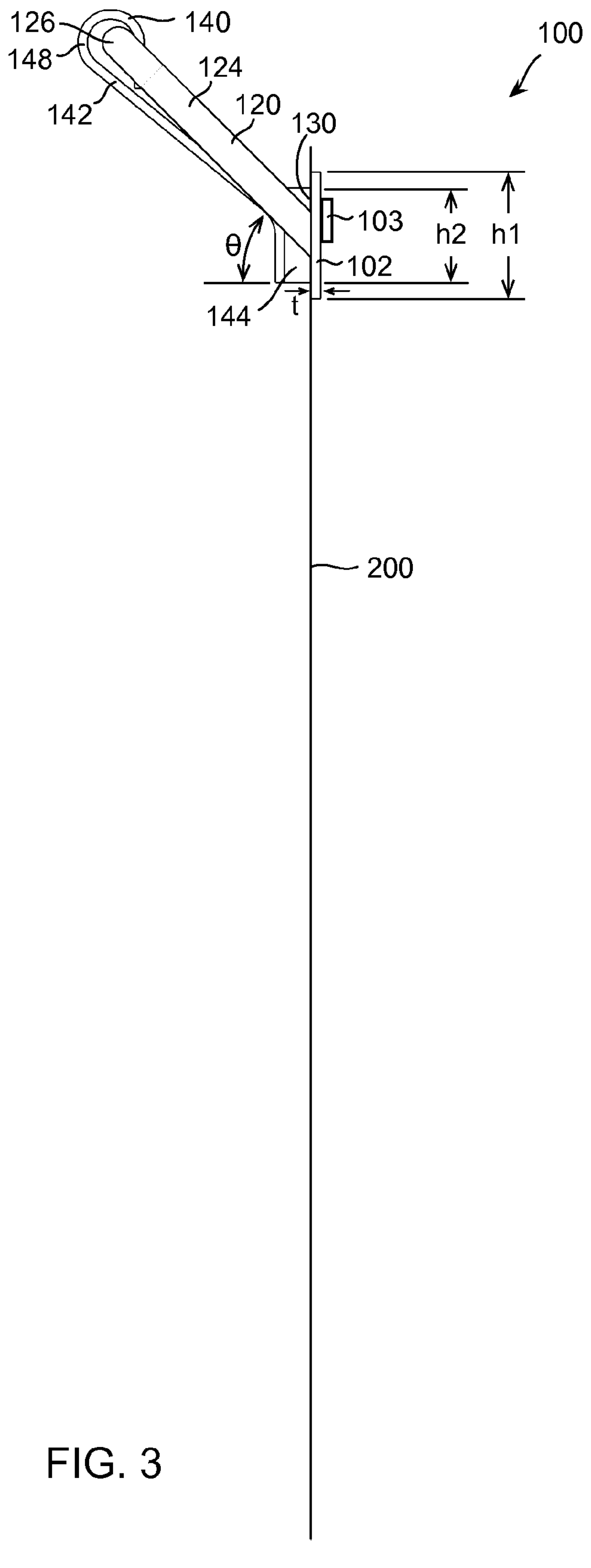
FIG. 3 illustrates a side view of the sheet material hanger of FIG. 1 that is holding sheet material.

FIGS. 1-3 illustrate a perspective view, front view, and side view, respectively, of an embodiment of a sheet material hanger 100. The sheet material hanger 100 may include a base 102, a magnet assembly support member 120, and a magnet assembly 140.

The base 102 may be formed of a magnetic or ferromagnetic material such that magnets are attracted thereto. The base 102 may be made of any material attracted to a magnet, such as, for example, iron, steel, and certain types of stainless steel. The base 102 may be entirely magnetic, or only a portion may be magnetic. Alternately, the base may be a magnet to which a magnet assembly support member 120, with or without a magnet attached thereto, is attracted.

The base 102 may be generally rectangular or another shape. The base 102 may have a thickness "t" adequate to provide support for the sheet material hanger 100 and any material to be hung therefrom. The base 102 may have a height "h1," which may be at least the height "h2" of the magnet or magnets 144 described below to provide an ample surface to which the magnet or magnets 144 may be attracted. The base 102 may have a width "w" sufficient to allow desired sizes of sheet materials to be positioned, at least in part, between the base 102 and the magnet assembly support member 120. For example, in an embodiment, the base 102 has a thickness t of about 0.074 inches, a height h1 of about 1 inch, and a width w of about 24 inches, and the magnets 144 each have a height h2 of about 0.25 inches. However, the base 102 and magnets 144 may be shaped and sized as desired, such as with a varying thickness, height, and/or width.

The base 102 may include one or more apertures, such as slots 108 and 110 or other-shaped apertures. The slots 108 and 110 may be sized as appropriate to allow fasteners, such as screws or nails, to extend through and then into a wall or other structure to attach the base 102, and thus the sheet material hanger 100, thereto.

In an embodiment, the base 102 includes, in addition or alternative to the aperture or apertures, an adhesive 103 that adheres to the base 102 to attach the base 102 to a wall or other structure. The adhesive may be attached to the back side of the base 102 (opposite the front side 130 from which, in one embodiment, the magnet assembly support member 120 described below extends), or may be attached to another part of the base 102. In an embodiment, the adhesive is double-sided tape, with one side of the double-sided tape adhering to the base 102, and the other side exposed to allow adherence to the wall or any surface.

In an embodiment, the magnet assembly support member 120 includes two first members 122 and 124 and a second member 126, though the magnet assembly support member 120 may be otherwise shaped to extend from the base 102 to support the magnet assembly 140 as described below. The first members 122 and 124 and second member 126 may be integral or separate, attached pieces. The magnet assembly support member 120 may be integral with the base 102 or attached thereto, such as by screw, adhesive, or other means.

The first members 122 and 124 may extend from the base 102. In an embodiment, the first members 122 and 124 extend from the front side 130 of the base 102. The second member 126 may extend between the first members 122 and 124. The first members 122 and 124 may have lengths and angles relative to the front side 130 to provide a desired space for insertion of sheet material 200 (illustrated in FIGS. 3-6) to be placed between the base 102 and the second member 126. If the second member 126 is substantially parallel to the base 102, for example, that space may be uniform along the width w of the base 102.

If desired, the first members 122 and 124 may extend at an "upward" angle θ relative to the front side 130 of the base 102 when the back side of the base 102 is attached to a vertical surface, such as a vertical wall. The upward angle θ is thus an angle in the direction at least partially away from the direction of gravity. The upward angle θ allows the second member 126 to be positioned above the base 102. As such, the second member 126 may be less likely to visually interfere when the top of any sheet material is held against the front side 130 of the base 102.

The second member 126 may extend so as to be substantially parallel to the base 102, and more specifically the front side 130 of the base 102 to permit the magnet assembly 140 described below to have uniform holding force among each holding member 142. Alternately, the second member 126 may be bent, scalloped, or shaped as desired. For example, the magnet assembly support member 120 may be shaped such as to limit the range of motion of one or more holding members 142 along the second member 126.

In an embodiment, the magnet assembly support member 120 does not include the first member 124, but only a single first member 122. In this embodiment, the first member 122 attaches the second member 126 to the base 102. In that way, sheet material 200 (illustrated in FIGS. 3-6) may extend through the space the first member 124 would have occupied were it included, and may possibly extend beyond the right edge of the base 102. In another embodiment, only the second member 124, and not the first member 122, is included to attach the second member 126 to the base 102.

The second member 126 may be shaped at least partially as a cylinder, which may facilitate movement of each holding member 142 of the magnet assembly 140, as described below, along the second member 126. The second member 126 may have a different shape, if desired. The length of the first members 122 and 124 may also be sized to permit desired thicknesses of sheet material to fit between the base 102 and the second member 126.

As discussed herein, the magnet assembly 140 may include one or more holding members 142 and one or more magnets 144. Each holding member 142 may be elongate. In one embodiment, each holding member 142 is made of sheet metal or another generally flat material that may be bent to form a loop, such as the loop 148 described below, at one end. In that embodiment, each holding member 142 may be bent at its other end such that the attached magnet 144 will be flush or close to flush with the front side 130 of the base 102 when in contact. However, the holding member or members 142 may be otherwise shaped as desired.

Each magnet 144 may be attached by adhesive or other means to a holding member 142, such as to the end opposite that of the loop 148, or to another part of the holding member 142. For example, in an embodiment, the magnets 144 are each attached to a holding member 142 using Loctite® 324 with Loctite® 7075 activator. In one embodiment, the magnet assembly 140 includes four holding members 142 and corresponding magnets 144. Having multiple holding members 142 and their magnets 144 permits the sheet material 200 to be held at multiple points of contact, and also allows for the holding of multiple pieces of sheet material against the base 102 by different magnets 144 if desired.

Each holding member 142 may be formed with a loop 148 at the end opposite the end where the magnet 144 is attached, such as shown in the figures, or the loop 148 may be otherwise positioned in the holding member 142, if desired. The loop 148 may be sized to extend around the circumference or other dimension of at least the second member 126 of the magnet assembly support member 120, such as shown, and possibly any part of the magnet assembly support member 120. As such, the holding member 142 may be hinged to the magnet assembly support member 120 such that the holding member 142 and its attached magnet 144 can rotate or otherwise be able to turn about at least the second member 126 of the magnet assembly support member 120. The loop 148 may form a smooth curve or another curve or shape that is sized and shaped to fit around the second member 126.

Figure 5:
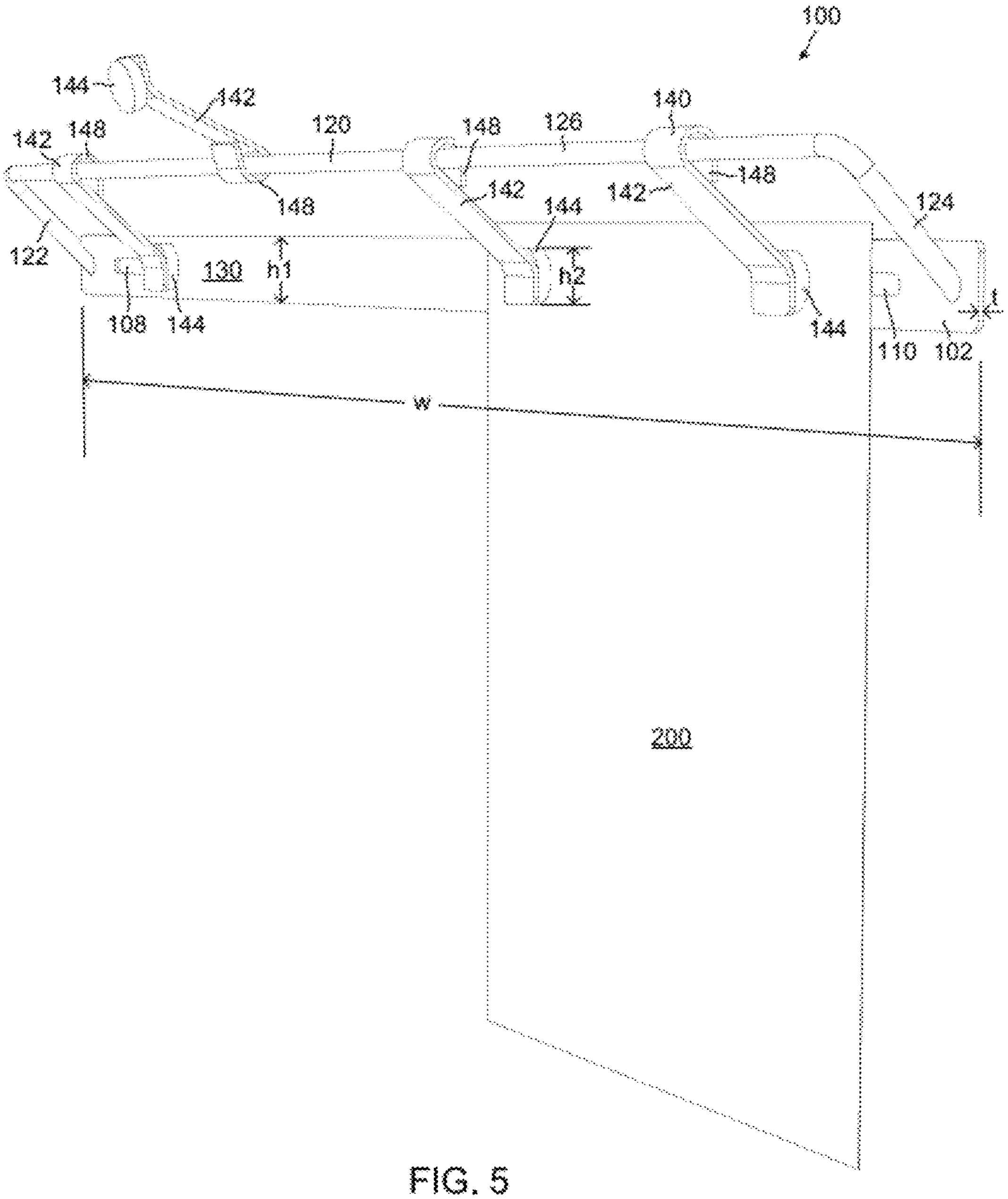
FIG. 5 illustrates a perspective view of an embodiment of a sheet material hanger that is holding sheet material.
Figure 6:
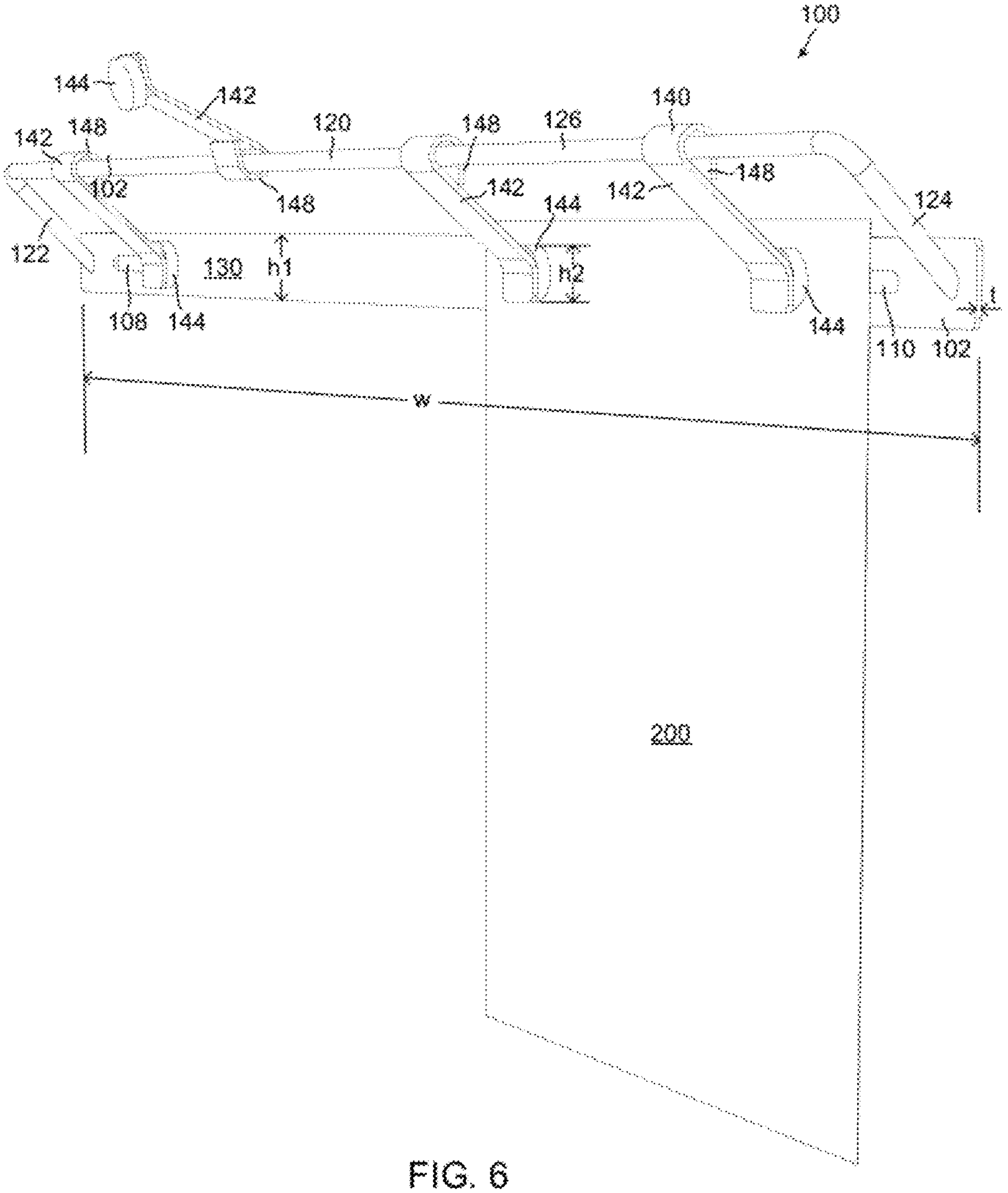
FIG. 6 illustrates a perspective view, showing hidden lines, of an embodiment of a sheet material hanger that is holding sheet material.

In an embodiment such as shown in FIG. 1, the magnet assembly 140 includes four holding members 142 with attached magnets 144. Each holding member 144 may be positioned such that the magnet 144 attached thereto is in contact with the base 102 by magnetic force. In FIG. 2, though, the second holding member 142 from the left has been rotated about the second member 126 of the magnet assembly support member 120, such that the attached magnet 144 has been rotated up and away from the base 102. FIGS. 5-6, described below, also show the second holding member 142 from the left so rotated. The other holding members 142 may also be so rotated.

In an embodiment, the sheet material hanger 100 is designed such that when attached to a wall or other vertical surface, the holding members 142 will freely hang, without enough magnetic force between their magnets 144 and the base 102 to pull the magnets 144 to the base 102. In this embodiment, the length and angle (with respect to the base 102) of the first members 122 and 124 of the magnet assembly support member 120, strength of magnets 144, and base 102 material, for example, may be chosen such that the sheet material hanger 100 will have the aforementioned characteristic. Alternately, the magnets, materials, and dimensions may be chosen such that the holding members 142 are attracted to the base 102 when hanging freely or as otherwise desired.

In an embodiment, the hinging of each holding member 142 to the magnet assembly support member 120 may be a slidable hinging. Thus, each holding member 142 may not only be able to rotate about the second member 126 of the magnet assembly support member 120, but may also be able to slide along the second member 126. Thus, each holding member 142 may be slid toward either first member 122 or 124 where both are provided if, for example, that holding member 142 is not to contribute to holding a piece of sheet material. Likewise, holding members 142 may be slid closer to each other. For example, that arrangement may be applied to position the magnets 144 on sheet material that is of narrow width, but heavy or thick enough to need the force of some or all magnets 144 to hold it in place. Holding members 142 may also each be moved toward one of the first members 122 and 124 in certain embodiments in which, for example, the holding member 142 loop 148 is sized for translation around a sweeping bend leading from the second member 126 to either of the first members 122 or 124. As will be recognized, the holding members 142 may be otherwise adjusted to facilitate holding sheet material of various sizes, shapes, and weights.

Figure 4:
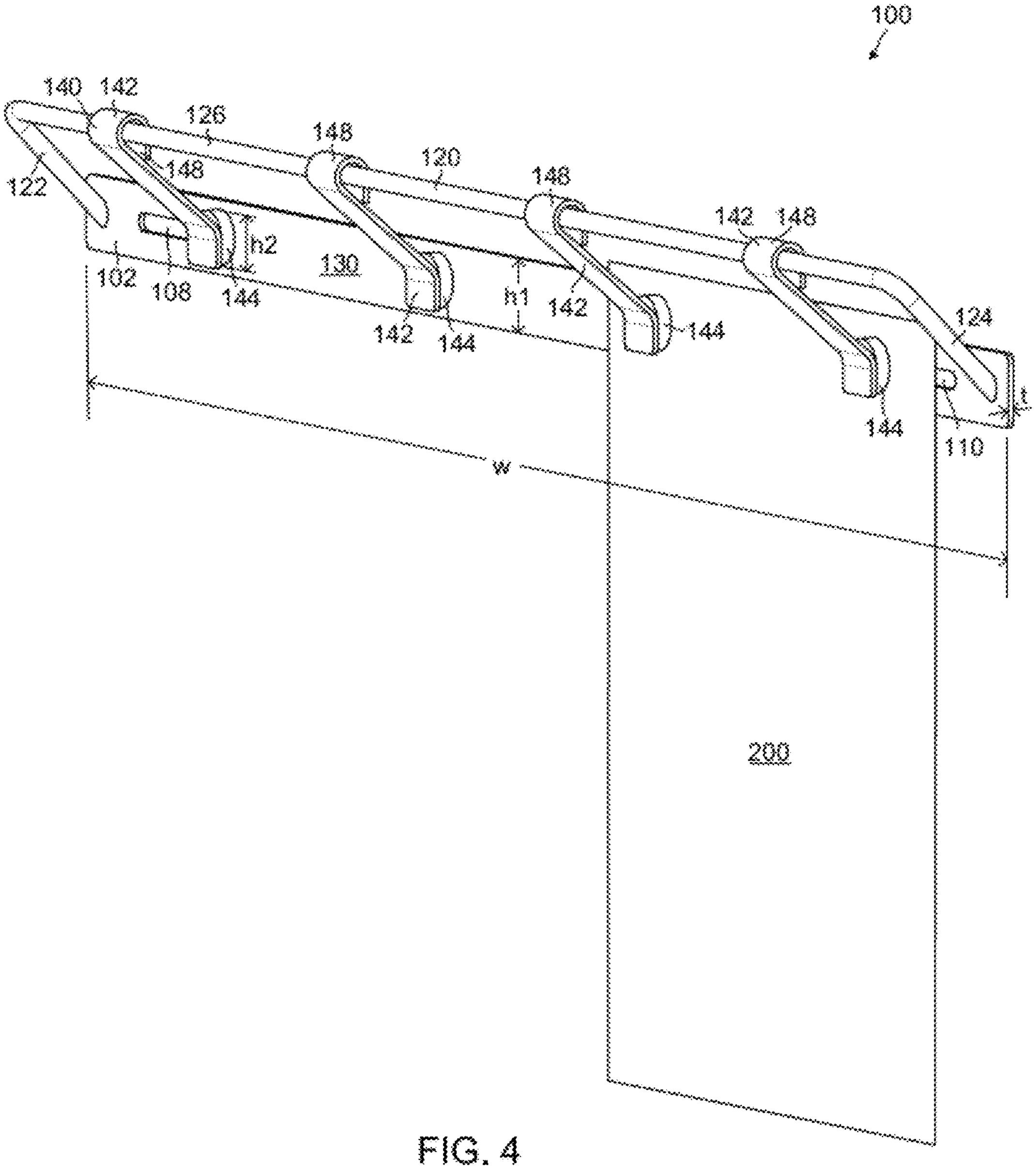
FIG. 4 illustrates a perspective view of an embodiment of a sheet material hanger that is holding sheet material.

FIG. 3, introduced above, shows a side view of the sheet material hanger 100 holding sheet material 200. FIGS. 4-6 illustrate perspective views of embodiments of a sheet material hanger 100 holding sheet material 200. Referring to FIGS. 3-6, the sheet material hanger 100 is holding the sheet material 200 in place between the base 102 and magnets 144 of the two holding members 142 to the right. Depending on the size, weight, and configuration of the sheet material 200, the sheet material 200 may be held using one or more of the holding members 142.

To hold the sheet material 200, one or more of the holding members 142 may be rotated up and away from the base 102, in a position such as that of the second holding member 142 from the left in FIGS. 2, 5, and 6. The sheet material 200 may be positioned adjacent the front side 130 of the base 102, and the two holding members 142 to the right may be rotated until their magnets 144 contact the sheet material, such as shown in FIGS. 3-6. The magnetic force attracting the magnets 144 to the base 102 may hold the sheet material 200 in place, such as by friction between the surfaces of the base 102, magnets 144, and sheet material 200. As discussed herein, the strength and number of magnets 144, along with the type of material of the base 102, may be chosen based on the forces, described herein, needed to hold the desired sheet material 200 in place.

A method of hanging sheet material is also provided that includes placing one or more pieces of sheet material 200 on the base 102, then moving one or more holding members 142 along the magnet assembly support member 120 adjacent the base 102, and magnetically attaching the sheet material 200 between the base 102 and the one or more holding members 142.

In an embodiment, the holding members 142 can be rotated on and moved along the magnet assembly support member 120 to position the holding members 142 along at least a desired length of the magnet assembly support member 120. As so positioned, the magnets 144 of the holding members 142 may apply magnetic force along that length to hold the sheet material 200. Thus, for example, the holding members 142 may be moved to engage portions of a non-rectangular piece of sheet material 200 that contacts the base 102 only in limited areas.

In an embodiment, the holding members 142 may be located such that a user must move the holding members 142 toward the base 102 to hold the sheet material 200 between the base 102 and magnets 144 of the holding members 142. That configuration may alleviate the need to manually hold the holding members 142 away from the base 102 when placing the sheet material 200 against the base 102.

It should also be recognized that magnets may be placed at various locations in the sheet material hanger 100 or incorporated into various components of the sheet material hanger 100. For example, in one embodiment, the base 102 includes or is in itself a magnet. In such an embodiment, the holding members 142 may simply be a material that is magnetically attracted to the base 102. In another embodiment, both the base 102 and the holding members 142 may include magnets. Those magnets may be arranged to apply the force of the magnets of both the base 102 and the holding members 142 to the sheet material 200. That arrangement may thus apply additional holding force on the sheet material 200 held therebetween.

It will be seen that embodiments of the present invention provide a wide variety of options for hanging sheet material 200, including artistic works of non-rectangular shape and made of non-standard materials. For example, a flower shaped piece of sheet material may be slid between and extend above the base 102 and the second member 126. The holding members 142 may then be slid along the second member 126 to appropriate locations and then rotated down to each contact one of various "petals" of the flower shaped piece. The magnet 144 of each of the one or more holding members 142 may then hold the flower shaped piece in place against the base 102.

Accordingly, while specific embodiments of the invention have been described in detail, it should be appreciated by those skilled in the art that various modifications and alternations could be developed in light of the overall teachings of the disclosure. Furthermore, the particular arrangements, apparatuses and methods disclosed are meant to be illustrative only and not limiting as to the scope of the invention.

What is claimed is:

1. A sheet material hanger, comprising:
- a base comprising one or more apertures, each through which a fastener may extend;
- a magnet assembly support member adjacent the base; and
- a magnet assembly comprising two or more holding members and two or more magnets, each of the two or more magnets attached to one of the two or more holding members, and each of the two or more holding members hinged to the magnet assembly support member, the hinging of the two or more holding members to the magnet assembly support member being a slidable hinging, wherein each of the two or more holding members may both rotate about the magnet assembly support member and slide along the magnet assembly support member.

2. The sheet material hanger of claim 1, the magnet assembly support member comprising a first member attaching the base to the magnet assembly support member.

3. The sheet material hanger of claim 2, wherein the magnet assembly support member is substantially parallel to the base.

4. The sheet material hanger of claim 2, the two or more holding members each including a loop extending around the magnet assembly support member of the magnet assembly support member.

5. A sheet material hanger, comprising:
- a base;

a magnet assembly support member adjacent the base, the magnet assembly support member comprising a first member attaching the base to the magnet assembly support member;

a magnet assembly comprising two or more holding members and two or more magnets, each of the two or more magnets attached to one of the two or more holding members, and each of the two or more holding members hinged to the magnet assembly support member, the hinging of the two or more holding members to the magnet assembly support member comprising a slidable hinging, wherein each of the two or more holding members may both rotate about the magnet assembly support member and slide along the magnet assembly support member; and the base comprising a front side and a back side, the first members of the magnet assembly support member extending from the front side of the base at an upward angle when the back side of the base is attached to a vertical surface.

6. The sheet material hanger of claim 1, the one or more holding members comprising four holding members.

7. The sheet material hanger of claim 1, the base comprising one or more apertures, each through which a fastener may extend.

8. The sheet material hanger of claim 1, the one or more apertures comprising two slots.

9. A sheet material hanger, comprising:

a base;

a magnet assembly support member adjacent the base;

a magnet assembly comprising two or more holding members and two or more magnets, each of the two or more magnets attached to one of the two or more holding members, and each of the two or more holding members hinged to the magnet assembly support member, the hinging of the two or more holding members to the magnet assembly support member comprising a slidable hinging, wherein each of the two or more holding members may both rotate about the magnet assembly support member and slide along the magnet assembly support member; and an adhesive adhering to the base.

10. The sheet material hanger of claim 9, wherein the adhesive is double-sided tape.

* * * * *